United States Patent [19]

Lenherr

[11] Patent Number: 4,720,006
[45] Date of Patent: Jan. 19, 1988

[54] APPARATUS FOR SEPARATING AND CONVEYING ELONGATE ARTICLES

[75] Inventor: Harald Lenherr, Neuhausen am Rheinfall, Switzerland

[73] Assignee: SIG Schweizerische Industrie-Gesellschaft, Neuhausen am Rheinfall, Switzerland

[21] Appl. No.: 911,501

[22] Filed: Sep. 24, 1986

[30] Foreign Application Priority Data

Oct. 9, 1985 [CH] Switzerland .................. 4354/85

[51] Int. Cl.⁴ .............................................. B65G 47/24
[52] U.S. Cl. .................................. 198/415; 198/689.1
[58] Field of Search ............................. 198/415, 689.1

[56] References Cited

U.S. PATENT DOCUMENTS

| | | | |
|---|---|---|---|
| 2,781,886 | 2/1957 | Stelzer | 198/415 X |
| 3,080,079 | 3/1963 | Lecrone et al. | 198/689.1 X |
| 3,321,062 | 5/1967 | Brockmuller et al. | 198/415 |
| 3,578,141 | 5/1971 | Sheehan | 198/415 |
| 3,774,749 | 11/1973 | Tobey et al. | 198/415 |
| 3,930,571 | 1/1976 | Svensson et al. | 198/25 |
| 4,085,839 | 4/1978 | Crawford | 198/415 X |
| 4,225,031 | 9/1980 | Frisbie et al. | 198/415 X |
| 4,284,186 | 8/1981 | Brouwer | 198/415 |
| 4,607,743 | 8/1986 | Elam | 198/415 |
| 4,645,069 | 2/1967 | Sjogren | 198/689.1 |
| 4,651,984 | 3/1987 | Emrich | 198/689.1 X |

FOREIGN PATENT DOCUMENTS

| | | |
|---|---|---|
| 62618 | 10/1982 | European Pat. Off. . |
| 2339405 | 3/1974 | Fed. Rep. of Germany . |
| 3426673 | 2/1985 | Fed. Rep. of Germany . |
| 67078 | 5/1969 | German Democratic Rep. ............... 198/415 |

Primary Examiner—Kenneth J. Dorner
Assistant Examiner—José V. Chen
Attorney, Agent, or Firm—Spencer & Frank

[57] ABSTRACT

An apparatus for separating and conveying elongate items includes a first pair of side-by-side arranged conveyor belts driven in a conveying direction at identical speeds, a second pair of side-by-side arranged conveyor belts being in longitudinal alignment with the first conveyor belt pair and being driven in the conveying direction at identical speeds greater than the speed of the first conveyor pair. First and second item transfer locations spaced from one another in the conveying direction are defined between the two conveyor belt pairs to cause each item to assume an oblique orientation relative to the conveying direction, and a longitudinal clearance defined between the belts of the first and second conveyor pairs. A suction device including a suction opening aligned with the longitudinal clearance is provided for pressing the items against the conveyor belts. There are further provided a conveyor in a longitudinal alignment with the conveyor belt pairs downstream thereof for receiving the items therefrom, and an item turning device situated above the conveyor for rotating each item into a longitudinal orientation which is at least approximately parallel to the conveying direction.

9 Claims, 6 Drawing Figures

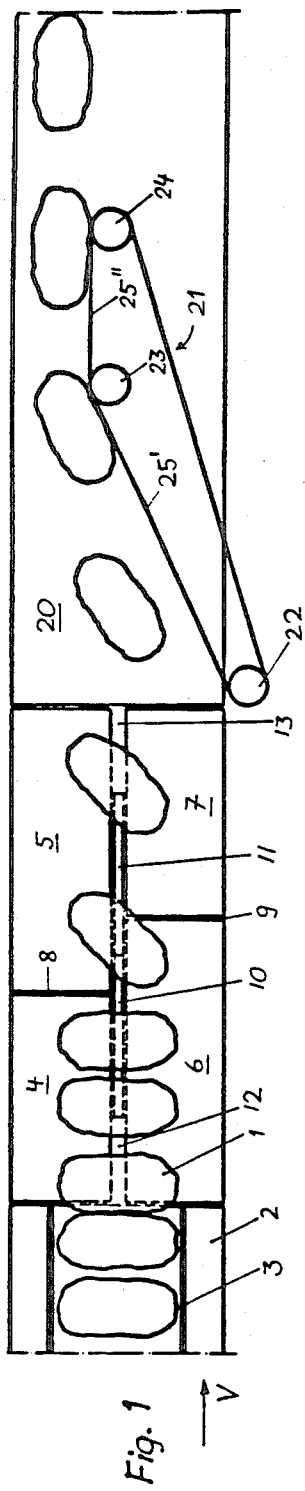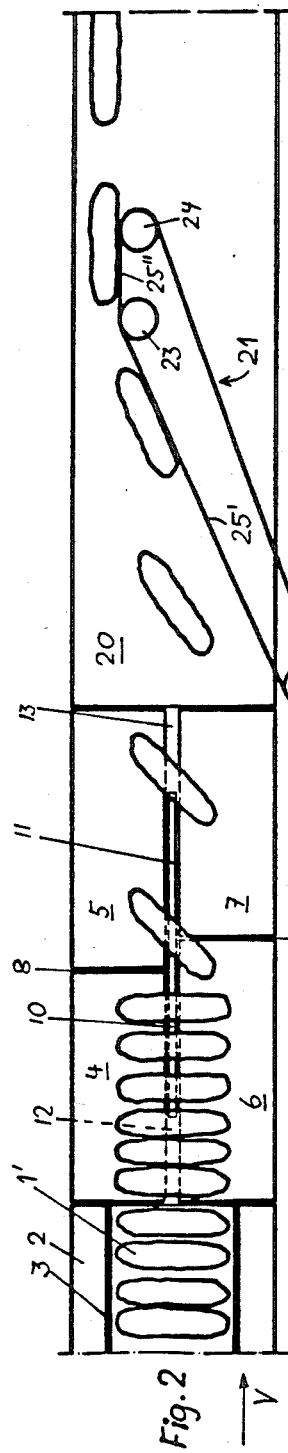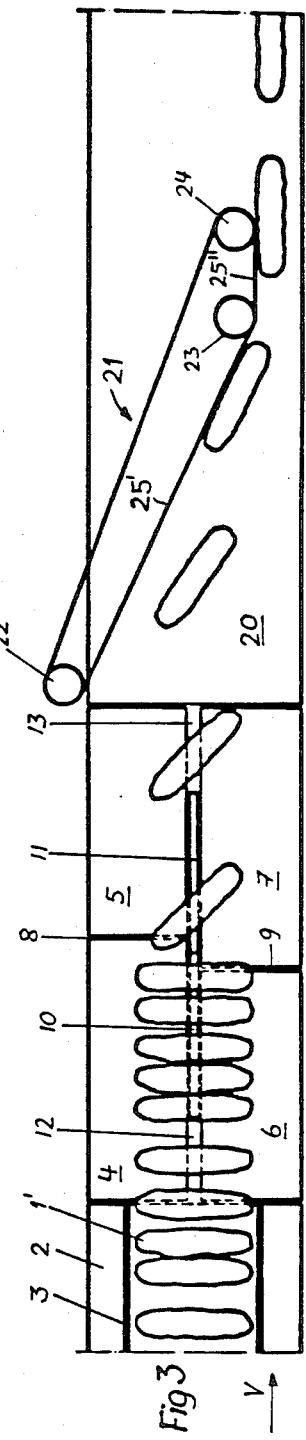

4,720,006

APPARATUS FOR SEPARATING AND CONVEYING ELONGATE ARTICLES

BACKGROUND OF THE INVENTION

This invention relates to an apparatus for separating elongate items, such as chocolate bars and then advancing the items to a subsequent processing station, such as a packing machine. Efficient packing machines for wrapping chocolate bars should receive the articles individually, that is, spaced from one another and in an orientation in which their longitudinal dimension is parallel to the direction of feed. Separating apparatuses suitable for this purpose are disclosed, for example, in U.S. Pat. No. 3,930,571, German Offenlegungsschriften (non-examined published patent applications) No. 2,339,405 and 3,426,673, as well as published European Patent Application No. 62,618.

Frequently, the chocolate bars are discharged from the production machine in a direction which is transverse to the longitudinal dimension of the article. In such cases, as disclosed in German Offenlegungsschrift No. 3,426,673 and European Patent Application No. 62,618, the conveying direction of the chocolate bars is altered by transferring the chocolate bars from a first conveyor belt to a second conveyor belt which is oriented perpendicularly to the first conveyor belt. In order to avoid malfunctions during such a transfer, according to the European Patent Application No. 626,618, the chocolate bars are, before they are transferred to the second conveyor, slightly turned in one direction whereby one end face of each article will be slightly leading relative to the opposite, other end face. In this manner, the articles will be transferred to the second conveyor belt such that they first engage the latter with their leading end portion and then, while the transfer is taking place, the items are turned back through the same angle so that, as a result, they will assume, on the second conveyor, an orientation which is identical to that they had on the first conveyor but they will be advanced by the second conveyor in a direction which is perpendicular to that of the first conveyor. In order to impart the slight turning motion on the items, the latter are first advanced on the first conveyor transversely to their length dimension by two side-by-side arranged conveyor belts driven with identical speed. The two conveyor belts are longitudinally adjoined by respective, side-by-side arranged further two conveyor belts whose identical speed is greater than that of the previous (upstream) conveyor pair. The two transfer locations between the upstream conveyor pair and the downstream conveyor pair are longitudinally offset so that, as a result, between the two transfer locations associated with the two pairs of conveyor belts, each article lies, along one length portion, on a relatively slowly advancing belt while the other length portion is already situated on a relatively fast running belt. This arrangement causes a slight twist of each article about an axis which is perpendicular to the face of the conveyor belts forming the two conveyor belt pairs.

The above-described apparatus, disclosed in the European Patent Application No. 62,618 is adapted for use only with relatively slow packing machines having an output of up to approximately 300 articles per minute. Also, the apparatus is poorly suited for irregular chocolate bars where occasionally two adjacent bars are connected to one another by their chocolate coating, because bars are not reliably separated by the prior art apparatus.

SUMMARY OF THE INVENTION

It is an object of the invention to provide an improved article separating apparatus of the type disclosed in European Patent Application No. 62,618 wherein the articles are reliably separated and are handled in a gentle manner permitting a high speed operation of the apparatus.

This object and others to become apparent as the specification progresses, are accomplished by the invention according to which, briefly stated, the longitudinal clearance between the side-by-side arranged belts of each conveyor pair is exposed to suction at least along a length portion which is situated between the two transfer location and further, downstream of the second, downstream transfer location, a turning mechanism is provided which, while maintaining the advancing direction of the articles, rotates them into an orientation in which they are at least approximately parallel to the direction of feed which is the same as that of the two conveyor belt pairs.

The suction opening between the transfer stations causes a greater adhesion of the articles to the conveyor belts. In case two adjoining articles are still connected to one another, the force is sufficient to break the two articles apart, thus resulting in a reliable separation. Further, the angle of rotation through which the articles are turned during the transfer is significantly more uniform than in the apparatus disclosed in the European Application No. 62,618. As a result, the further rotation in the subsequent rotating stage is considerably simplified. Since such a subsequent rotation is effected while the direction of article advance remains unchanged, that is, no change of the direction of conveyance by 90° is necessary, a gentle handling of the articles is ensured and thus significantly higher speeds than in prior art arrangements may be achieved. In test runs incorporating the invention, a handling speed of 1,000 articles per minute has already been reached which is amply sufficient for the fastest known high performance packing machines.

BRIEF DESCRIPTION OF THE DRAWINGS

FIGS. 1, 2 and 3 are schematic top plan views of a preferred embodiment, illustrating three different machine settings, respectively.

DESCRIPTION OF THE PREFERRED EMBODIMENT

Figure 4:
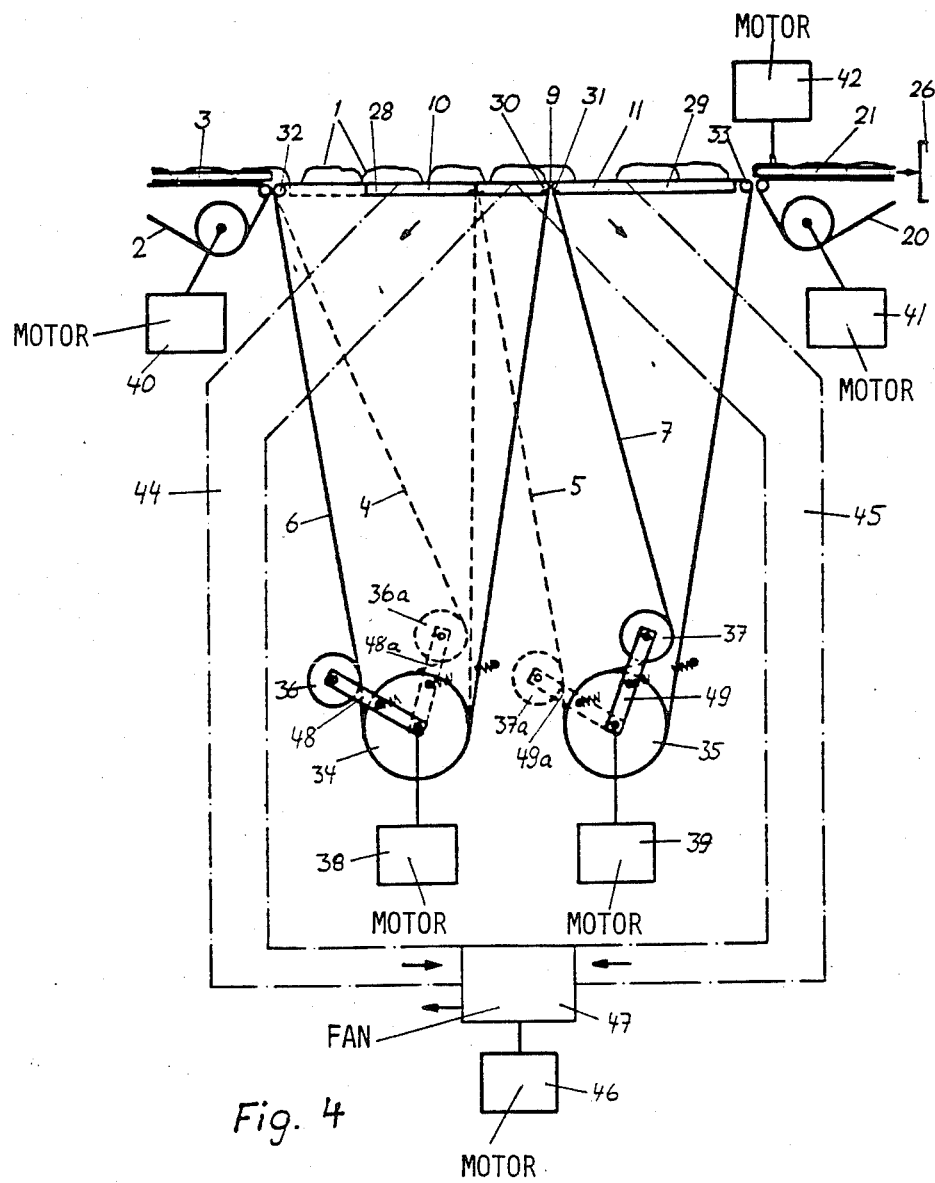
FIG. 4 is a schematic sectional side elevational view of the preferred embodiment.

Turning to FIGS. 1, 2 and 3, a production machine (not shown) discharges chocolate bars 1 and deposits them on a conveyor belt 2 between two longitudinally extending rails 3, in a length-wise orientation which is transverse to the conveying direction V. From the conveyor belt 2 the articles 1 are admitted to a further conveyor formed by a pair of side-by-side arranged, parallel running conveyor belts 4 and 6 which are driven with identical speeds. Each article is supported, along two consecutive length portions thereof, simultaneously by both conveyor belts 4 and 6. The articles 1 are so positioned that the longitudinal clearance 12 defined between the two conveyor belts 4 and 6 is situated approximately centrally with respect to the articles 1.

The articles 1 are transferred from the conveyor belts 4 and 6 at transfer locations 8 and 9 to respective conveyor belts 5 and 7 which run at the same speed which, however, is higher than the speed of the conveyor belts 4 and 6. In FIGS. 1 and 2, the transfer location 9 situated between the belts 6 and 7 is situated downstream of the transfer location 8 defined between the conveyor belts 4 and 5. In the FIG. 2 arrangement, the distance between the transfer locations 8 and 9 is smaller than that according to the FIG. 1 construction.

Thus, between the transfer locations 8 and 9, the article is supported, along one length portion thereof, by the relatively low-speed belt 9, whereas along the other length portion, the article is supported by the relatively high speed belt 5. As a result, the article 1 is turned clockwise as it travels in the conveying direction V between the transfer locations 8 and 9.

In the FIG. 3 variant where the speed conditions of the conveyor belt 4, 5, 6 and 7 are the same as those according to the constructions in FIGS. 1 and 2, the transfer location 8 is situated downstream of the transfer location 9 and consequently, as the articles travel between the transfer locations 8 and 9, they are turned counterclockwise by virtue of the low-speed belt 4 and the high-speed belt 7 which simultaneously engage each article in the zone between the two transfer locations 8 and 9.

In the longitudinal clearance 12, defined essentially between the conveyors 4 and 6 and between the longitudinal clearance 13 defined essentially between the conveyor belts 5 and 7 there is arranged an elongate suction opening which is formed of consecutive length portions 10 and 11 and through which air is drawn by suction means described in more detail later in conjunction with FIG. 4. The air stream exerts a vacuum force on the articles 1 which are thus pressed against the conveyor belts 4-7. The adhesion between the articles 1 and conveyor belts 4-7 has a significant force, as a result of which the articles are reliably separated and turned by the conveyor belts 4-7 through an at least approximately constant angle. The suction opening portion 11 extends in a downstream direction beyond the downstream transfer location 9 (FIGS. 1 and 2) or 8 (FIG. 3). This arrangement has the advantage that the rotary motion imparted on the articles 1 as they travel between the transfer locations 8 and 9 is rapidly stopped as the article 1 is transferred onto the conveyor belt 7. The suction opening portion 10 extends in the upstream direction beyond the upstream transfer location 8 (FIGS. 1 and 2) or 9 (FIG. 3). By virtue of this arrangement, each article 1 positioned immediately upstream of the upstream transfer location is retained firmly on the slower conveyor belts 4 and 6 while the article situated immediately downstream of the upstream transfer location is rotated by the high-speed belt 5. Such arrangemen enhances the reliability of the separation of adhering articles 1.

The conveyor belts 5 and 7 place the rotated articles 1 onto an alignment conveyor belt 20 which has the same conveying direction V as the belts 2 and 4–7 and which runs at a speed which is at least as high as that of the conveyor belts 5 and 7. The alignment conveyor belt 20 delivers the articles 1 to a packing machine symbolically indicated at 26 in FIG. 4.

Above the alignment conveyor belt 20 there is supported an endless guide belt generally designated at 21 by means cf end rollers 22 and 24 and a deflecting roller 23. One of the rollers 22, 23 and 24 is a power roller to drive the guide belt 21 in a clockwise direction as viewed in FIGS. 1 and 2 and in a counterclockwise direction as viewed in FIG. 3. The guide belt 21 has a guide belt portion 25' defined between the upstream end roller 22 and the deflecting roller 23. The guide belt portion 25' is arranged obliquely with respect to the conveying direction V at an inclination which is close to that of the inclination of the articles as they are transferred onto the alignment conveyor belt 20. The guide belt 21 further has a guide belt portion 25" defined between the deflecting roller 23 and the downstream end roller 24. The guide belt portion 25" is oriented parallel to the conveying direction V and is arranged at an angle greater than 180° relative to the orientation of the guide belt portion 25'.

In operation, as the articles 1 are advanced on the alignment conveyor belt 20 towards the guide belt 21, they arrive into contact with the guide belt portion 25' which laterally shifts the articles and may slightly turn them in the same sense as effected by the conveyor belts 4–7. Thereafter, each article rocks about the deflecting roller 23 acting as a fulcrum and is guided by the guide belt portion 25" to assume a lengthwise orientation which is parallel to the conveying direction V.

By virtue of the acute angle between the guide belt 21 and the conveying direction V, the articles 1 arrive into contact with the guide belt 21 at a very small relative speed, as a result of which the articles 1 are handled in a very gentle manner.

Turning now in particular to FIG. 4, there is illustrated therein the drive for the conveyor belts 4–7. The conveyor belts 4–7 run on flat support plates 28, 29, each of which has a respective deflecting edge 30, 31 at the transfer locations 8 and 9. As a result of this feature, the articles are, at the location where they are turned and braked, supported in an optimal manner so that malfunctions are substantially eliminated. At the opposite end of the conveyor path, the conveyor belts 4–7 are guided over respective deflecting rollers 32, 33. The belts are driven by respective drive rollers 34, 35 and are maintained taut by tensioning rollers 36, 37. The drive rollers 34 and 35 are driven by rpm-regulated motors 38 and 39.

The four belts 4–7 are of equal length which simplifies the keeping of replacement stock. Since the working path of the belts 4, 7 in the arrangements according to FIGS. 1 and 2 is shorter than that of the belts 5, 6, the pivotal arms 48a, 49 carrying the tensioning rollers 36a, 37 associated with the belts 4, 7 are deflected to a greater extent than the pivotal arms 48, 49a associated with the belts 5, 6.

FIG. 4 further illustrates drive motors 40, 41 and 42 for the conveyor belts 2 and 20 as well as the guide belt 21, respectively. From the two length portions 10 and 11 of the suction opening there extend two channels 44 and 45 to a suction fan 47 driven by a motor 46.

Figure 5:
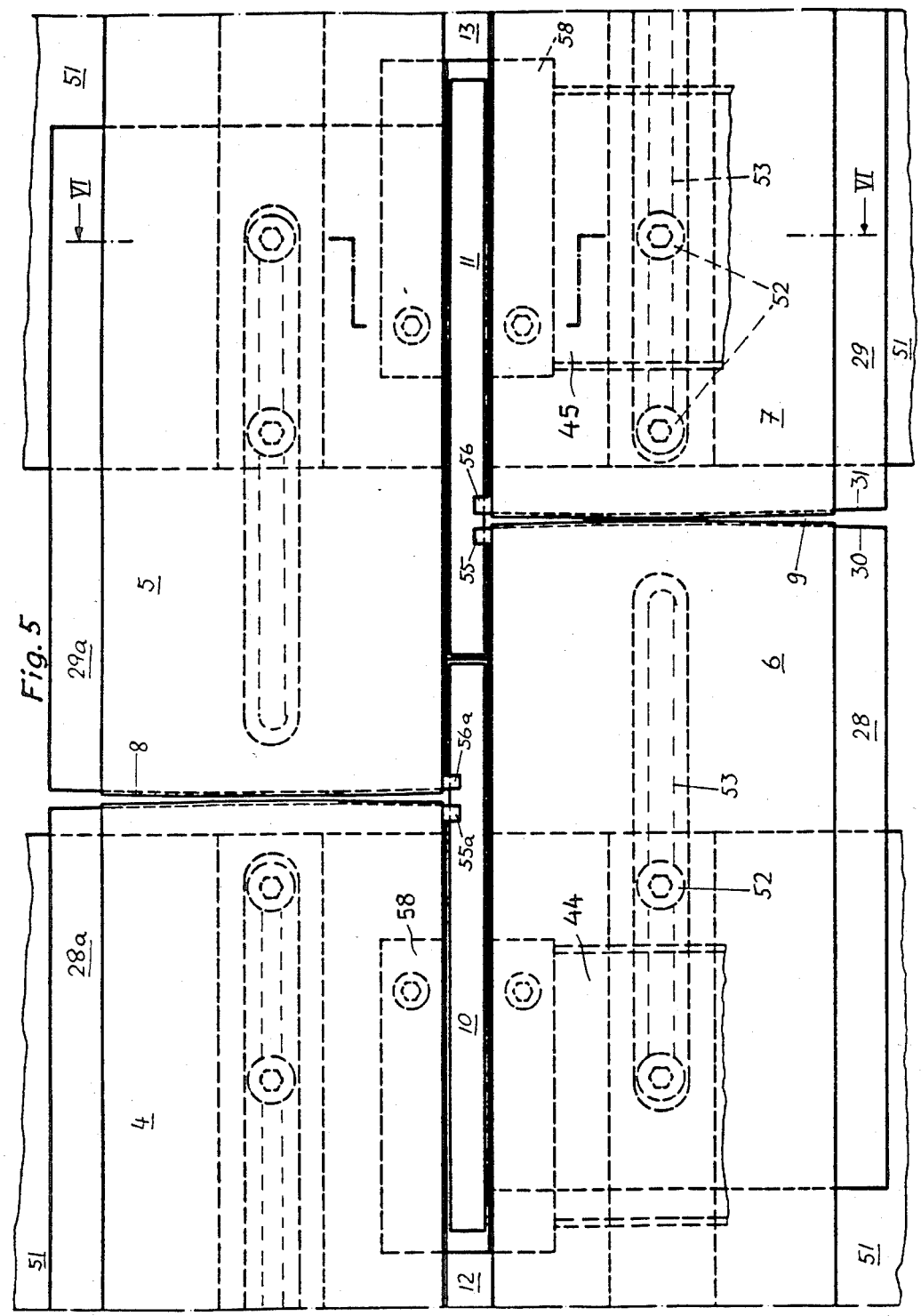
FIG. 5 is a top plan view of one part of the preferred embodiment illustrated on an enlarged scale relative to FIGS. 1-3.
Figure 6:
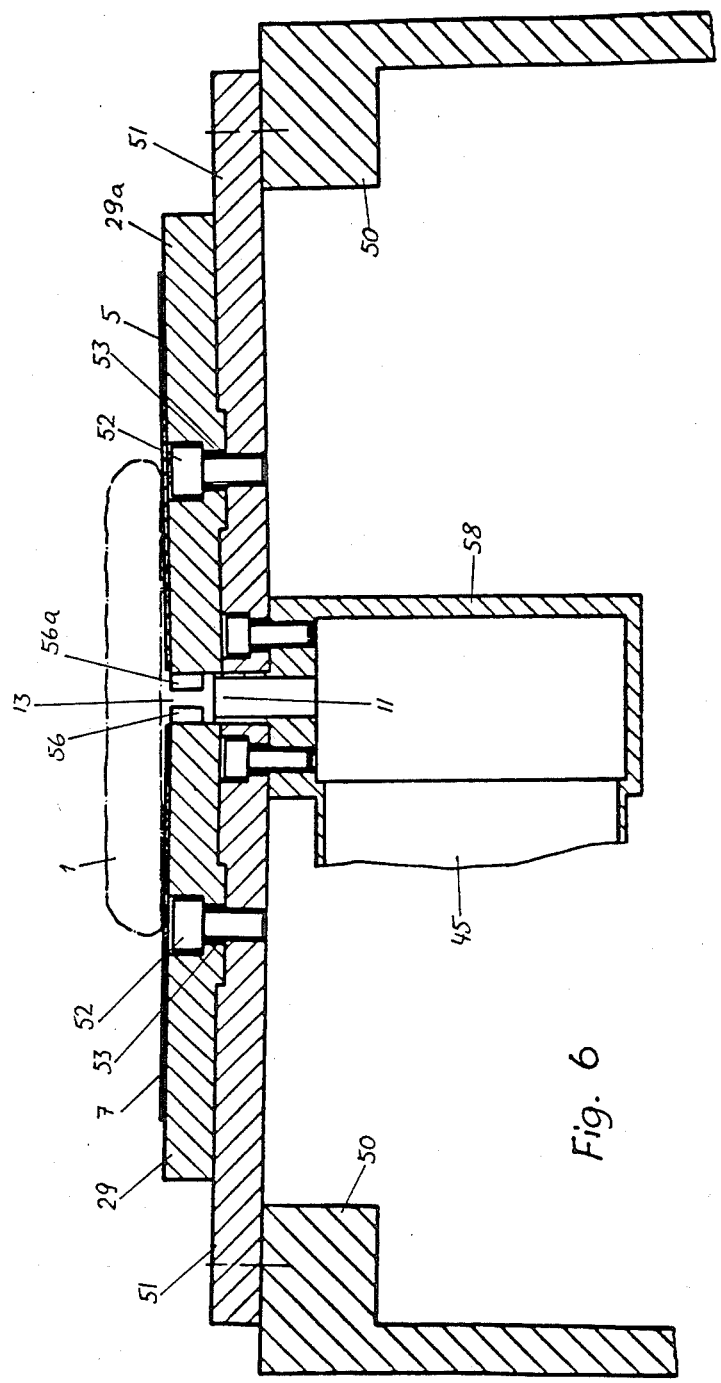
FIG. 6 is a sectional view taken along line VI—VI of FIG. 5.

Turning now to FIGS. 5 and 6, the support plates 28, 29, 28a and 29a for the belts 4–7 are mounted by means of screws 52 to plates 51 which are rigidly affixed to a machine frame 50. The screws 52 extend through longitudinal slots 53 provided in the four support plates so that the position thereof is adjustable in the conveying direction. In this manner, the mutual distance between the transfer locations 8 and 9 measured in the conveying direction may be adjusted. Such an adjustment is useful to adapt the turning angle of the articles 1, effected by the belts 4-7, to the particular shape of the articles 1. For example, for relatively short and wide articles 1 (FIG. 1) it is expedient to use a greater distance between the transfer locations 8 and 9 than for relatively long and narrow articles 1' (FIGS. 2 and 3).

The support plates 28, 28a, 29, 29a have deflecting edges 30, 31 which have a slight convex course in order to prevent a lateral creeping of the belts 4-7. The support plates further have, as a continuation of the deflecting edges 30, 31, lateral lugs 55, 56, 55a, 56a to ensure that the belts 4-7 do not run over a sharp edge even if a slight lateral creeping motion of the belt has taken place.

Each suction channel 44, 45 opens into a housing 58 which is secured to a respective plate 51 and which has the respective upwardly oriented suction opening portion 10 and 11 aligned with the clearances 12 and 13.

Due to the adjustable length of the conveying paths of the belts 4-7, the apparatus may be readily adapted to the operating conditions which may be easily monitored. For example, for a ready monitoring from the left, relative to the conveying direction V, the transfer station is situated downstream of the transfer location 8 (FIGS. 1 and 2) in which case the upstream end of the guide belt 21 is at the right as viewed in the conveying direction V. For monitoring from the right, on the other hand, the transfer location 9 is situated upstream of the transfer location 8 (FIG. 3) and, accordingly, the upstream end of the guide belt 21 (that is, its end roller 22) is situated on the left.

As may be seen in FIG. 6, the conveyor belts 5 and 7 (and also the conveyor belts 4 and 6) are inclined slightly to one another in a large-angle V-configuration. As a result, the items 1 engage the belts 4-7 only at their opposite end zones. It is an advantage of such an arrangement that the magnitude of turning angles through which the articles are rotated by the apparatus are highly uniform even in case the article 1 does not have a fully planar underside. Further, by virtue of this arrangement, there is achieved a highly reliable break of the interconnected articles by the required forces. The axes of the drive rollers 34 and 35 for the side-by-side arranged conveyor belts 4, 6 and, respectively, 5, 7 are, corresponding to the angle of inclination of the conveyor paths of the belts 4-7 slightly inclined relative to one another and are interconnected to one another, for example, by means of a Cardan joint.

The present disclosure relates to subject matter contained in Swiss Patent Application No. 4354/85 (filed Oct. 9th, 1985) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In an apparatus for separating and conveying elongate items having a generally flat bottom; the apparatus including first and second conveyor belts arranged in a side-by-side, parallel orientation and being driven codirectionally in a conveying direction at identical first speeds; said first and second conveyor belts being arranged for simultaneously supporting each item in a transverse orientation relative to said conveying direction; third and fourth conveyor belts arranged in a side-by-side, parallel orientation in longitudinal alignment with respective said first and second conveyor belts downstream thereof as viewed in said conveying direction; said third and fourth conveyor belts being driven codirectionally in said conveying direction at identical second speeds greater than said first speeds; a first item transfer location defined between a downstream end of said first conveyor belt and an upstream end of said third conveyor belt; a second item transfer location defined between a downstream end of said second conveyor belt and an upstream end of said fourth conveyor belt; said first and second item transfer locations being spaced from one another parallel to said conveying direction whereby each item being turned to assume an oblique orientation relative to said conveying direction and a longitudinal clearance oriented parallel to said conveying direction being defined between the first and second conveyor belts and between the third and fourth conveyor belts; the improvement comprising
   (a) suction means including a suction opening aligned with said longitudinal clearance and extending in said conveying direction at least between said first and second item transfer locations for pressing the items by a suction air stream against at least some of said first, second, third and fourth conveyor belts;
   (b) a conveyor arranged in a longitudinal alignment with said third and fourth conveyo belts downstream thereof for receiving the items from said third and fourth conveyor belts; said conveyor being driven in a direction identical to said conveying direction; and
   (c) item turning means situated above said conveyor for rotating each item, during advance thereof on said conveyor, into a longitudinal orientation which is at least approximately parallel to said conveying direction.

2. An apparatus as defined in claim 1, further comprising means for altering the distance between said first and second item transfer locations.

3. An apparatus as defined in claim 1, wherein said suction opening extends beyond at least one of said item transfer locations in a direction away from the other said item transfer location.

4. An apparatus as defined in claim 1, wherein the downstream end of said first and second conveyor belts and the upstream end of said third and fourth conveyor belts are supported by and guided about respective deflecting edges extending transversely to said conveying direction.

5. An apparatus as defined in claim 1, wherein the first and second conveyor belts and the third and fourth conveyor belts are arranged in a non-coplanar relationship to one another such that each item is supported only at end zones thereof by the first and second conveyor belts and the third and fourth conveyor belts.

6. An apparatus as defined in claim 5, wherein the first and second conveyor belts and the third and fourth conveyor belts are arranged in a V-configuration as viewed in a direction transverse to said conveying direction.

7. An apparatus as defined in claim 1, wherein said conveyor is a fifth conveyor belt.

8. An apparatus as defined in claim 7, wherein said item turning means comprises a driven endless guide belt positioned above said fifth conveyor belt; said guide belt having a first item guiding portion oriented obliquely to said conveying direction and a second item guiding portion adjoining said first item guiding portion downstream thereof; said second item guiding portion being oriented parallel to said conveying direction.

9. An apparatus as defined in claim 8, further comprising upstream and downstream end rollers supporting said guide belt; said upstream end roller being situated downstream of said second item transfer location.

* * * * *